Figure 1:
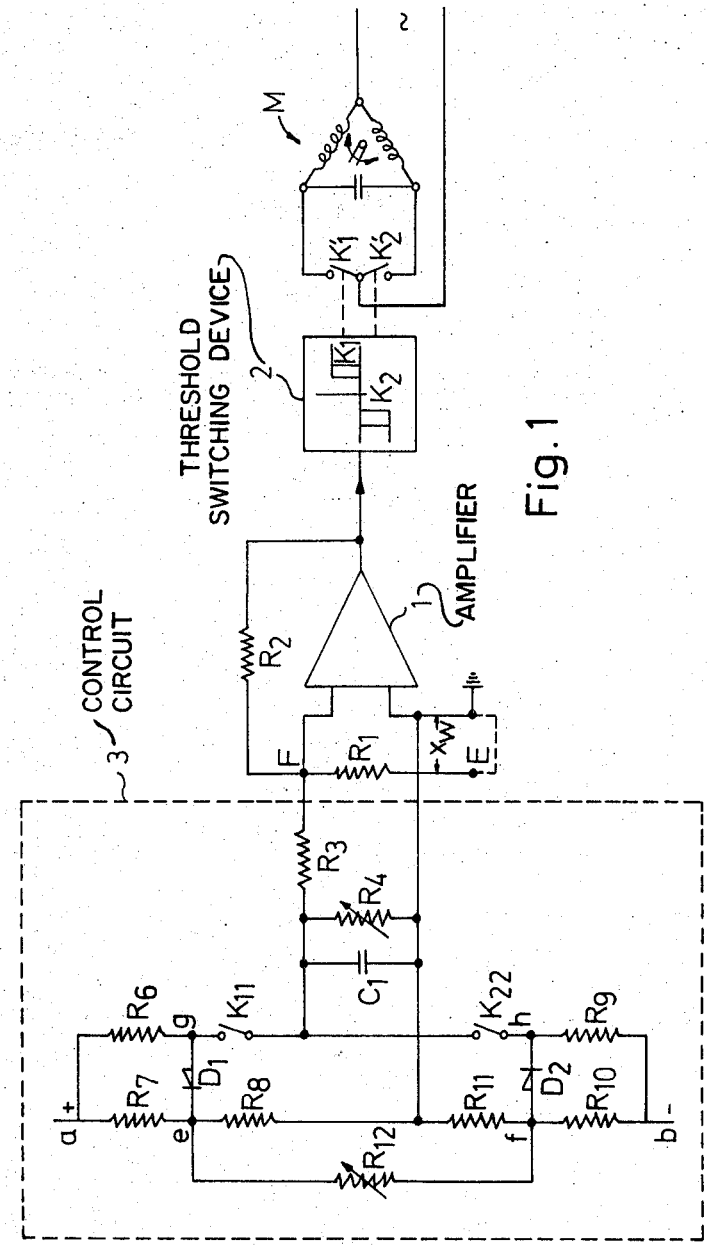

United States Patent
Iversen

[15] 3,704,404
[45] Nov. 28, 1972

[54] REGULATING MEANS

[72] Inventor: Kristen Iversen, Sonderborg, Denmark

[73] Assignee: Danfoss A/S, Nordborg, Denmark

[22] Filed: Dec. 10, 1970

[21] Appl. No.: 96,719

[30] Foreign Application Priority Data

Dec. 17, 1969 Germany..........P 19 63 228.1

[52] U.S. Cl..................................318/290, 318/624
[51] Int. Cl..............................................G05b 11/06
[58] Field of Search......318/281, 285, 290, 478, 285, 318/599, 619, 624, 596

[56] References Cited

UNITED STATES PATENTS

| | | | |
|---|---|---|---|
| 3,510,738 | 5/1970 | Iversen | 318/624 X |
| 2,601,060 | 6/1952 | Runaldue | 318/285 |
| 2,701,327 | 2/1955 | Ringoen | 318/290 X |
| 3,519,907 | 7/1970 | White et al. | 318/281 X |

Primary Examiner—Bernard A. Gilheany
Assistant Examiner—W. E. Duncanson, Jr.
Attorney—Wayne B. Easton

[57] ABSTRACT

The invention relates to a servomotor regulating unit having an adjustable proportional range. The servomotor is responsive to the output variable of the regulator which in turn is responsive to a sensed deviation voltage. An R-C unit in a an input circuit of the regulator has the charging voltage thereof switched on and off in synchronism with the switching on and off of the servometer. In known regulators the width of the proportional range and the amplification is adjusted by varying the charging voltage of the R-C unit with a potentiometer whereas in this invention they are adjusted independently of each other by limiting the voltage at the R-C unit to an adjustable value that is below the charging voltage and by making the charging time-constant of the R-C unit independent of this limiting value.

4 Claims, 2 Drawing Figures

REGULATING MEANS

The invention relates to a regulating means having an adjustable proportional range, in which means an electrical control element, responsive to current, is connected on the output side of a proportional regulator by way of a switching device which responds in dependence upon the output variable of the regulator and switches the power supply to the control element on and off, and which regulating means if put in opposition by a deviation, represented by a voltage, in the input circuit of the regulator of the voltage occurring in a parallel RC-element, and the charging voltage of the RC-element is switched on and off in synchronism with the switching on and off of the control element.

In a known regulating means of this kind, the mean control rate of the control element, i.e., the change in the control factor per unit of time, is proportional to the ratio of the on period to the off period of the control element. The on period is here determined by the time required by the condenser of the RC-element to charge up to a value at which the difference between the voltage at the RC-element and the voltage corresponding to the deviation $X_w$ (or the difference $X_d = -X_w$) is zero or falls below a predetermined value at which the control element is switched off. The off period is determined by the time required by the condenser of the RC-element to discharge to a value at which this difference is again so great that the switching device responds and the control element again switches on. The ratio of the on period to the off period is thus also determined by the charging voltage, towards which the final value of the voltage at the RC-element or at this condenser moves during charging, and by the time-constant of the RC-element.

The extend of the change in the magnitude of this ratio in dependence upon the magnitude of the deviation however is also a determining factor for the amplification of the regulator and thus for the stability of the regulating circuit. In order now to prevent too small an amplification of the regulator in the case of excessively large deviations such as occur upon switching on (starting up) or when large interference factors are present, and thus to prevent excessively slow balancing of the deviation and to avoid, in the case of small deviations, balancing to an extend such that the regulating circuit becomes unstable, i.e., itself sets up oscillations, that width of the proportional range $X_p$ that governs the two factors is adjusted in dependence upon the magnitude of the expected deviation. (The expression "P-range" is here intended to signify that deviation range or variable range of the factor to be regulated in which proportionality obtains between such deviations and the control rate of the control element). In the known regulating means, this adjustment is made by varying the charging voltage of the RC-element by way of a potentiometer. A disadvantage with this however is that the charging time-constant of the RC-element varies simultaneously therewith, since the resistance of the potentiometer is also involved in this constant. A further disadvantage resides in the fact that when the amplification of the regulator is changed, the width of the P-range also changes, i.e., when the amplification is increased the P-range becomes smaller, and vice versa. Thus, if a smaller amplification is used to achieve stable regulation and, in particular, to prevent excess oscillation in the case of relatively large deviations, then the deviation is balanced out relatively slowly. In many cases this cannot be tolerated.

The object of the invention therefore is to provide a form of regulating means such that the width of the proportional range and the amplification can be adjusted independently of each other.

According to the invention and proceeding from a regulating means of the initially mentioned kind, this object is achieved by limiting the voltage at the RC-element to an adjustable value that is below the charging voltage, and by making the charging time constant of the RC-element independent of this limiting value.

By adjusting the limiting value of the voltage at the RC-element, the limit of the proportional range is fixed and the amplification is determined by the time-constant setting.

An advantageous arrangement whereby this object is achieved is that wherein the RC-element is connected through a diode and a switching stage of the switching device to a tap-off point of a voltage divider, and the connecting point between the diode and the switching stage is connected through a resistor to one of the poles of the charging voltage source that feeds the voltage divider.

If a reversible servo-motor is used as the control element, the invention can be extended to achieve regulation in both directions of rotation by providing in the switching device a switching element responding to positive output signals from the regulator and a switching element responsive to negative regulator output signals, by connecting, in series with a voltage divider, a second voltage divider, the tap-off point of which is likewise connected to the RC-element through a diode and a switching stage, the connecting point between the second switching stage and the second diode being connected to the other pole of the charging voltage source through a resistor and a middle point in the charging voltage source being connected to a reference potential, and by the first-mentioned switching stage being actuable by one of the switching elements simultaneously with a switching stage contained in the feed-current circuit for one of the directions of rotation of the servo-motor, and the second switching stage being actuable by the other switching element simultaneously with a switching stage contained in a feed-current circuit for the other direction of rotation.

For the purpose of adjusting the limiting value, the tapping-off point of the two voltage dividers are connected through an adjustable resistor.

To adjust the time-constant, the resistor of the RC-element is designed to be adjustable.

Figure 2:
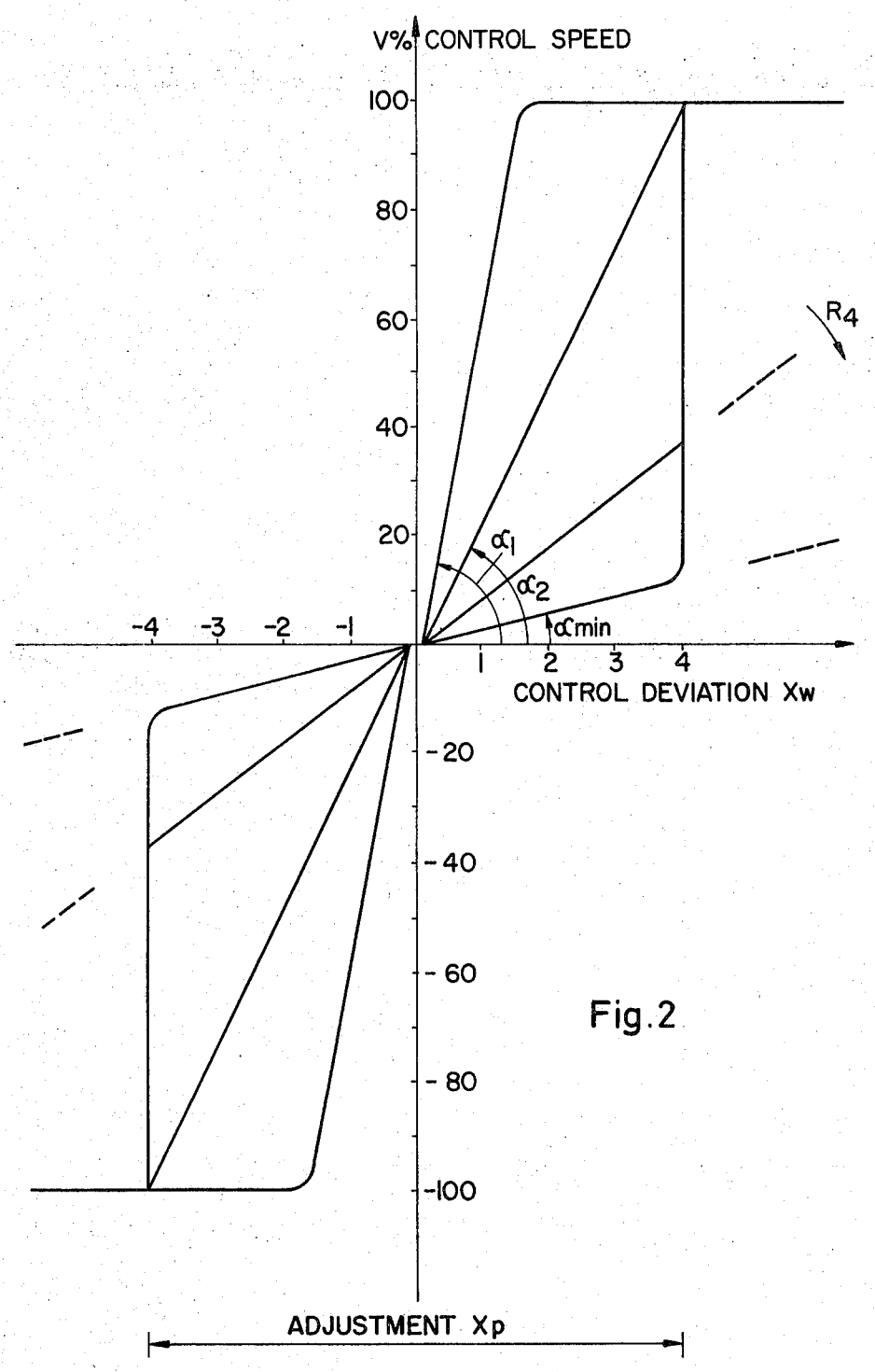

The invention and its extended forms will now be described in more detail by reference to a preferred embodiment illustrated in the drawings, in which:

FIG. 1 shows the connection diagram for a regulating means in accordance with the invention, and FIG. 2 shows the static characteristic curves relating to the dependence upon deviation of the control rate of the control element of the regulating means of FIG. 1.

In the regulating means of FIG. 1, a threshold switching device 2 is connected on the output side of a proportional regulator, which comprises a high-strength amplifier 1 which feeds back through a resistor $R_2$ of approximately 20 megohms. The threshold switching device 2 comprises two switching elements $K_1$ and $K_2$, which may constitute a relay. The switching element $K_1$ responds when the output voltage of the amplifier 1 is positive, and the switching element $K_2$ responds when said voltage is negative. By way of example, the operation is such that the threshold limits are +2 volts and −2 volts, the switch element $K_1$ would be actuated by a voltage in excess of 2 volts and $K_2$ would be actuated by a voltage with falls lower than 2 volts. Each switching element opens and closes two switching stages $K'_1$ and $K_{11}$, and $K'_2$ and $K_{22}$ respectively, which switching stages can take the form of relay contacts. The switching device together with the switching elements and switching stages can however be of purely electronic form. The switching stage $K'_1$ is contained in the feed circuit for one direction of rotation of a reversible servo-motor M which acts as a switching element, and the switching stage $K'_2$ is contained in the feed circuit for the other direction of rotation. Depending upon whether $K'_1$ or $K'_2$ is closed, the motor will turn in one or the other direction.

The servo-motor displaces, for example, a valve which controls the flow of a hot medium. The flow medium can be used for heating a room the temperature of which is to be regulated. The actual value of the temperature is measured by means of a temperature sensor and is compared with an adjustable required value. The difference, i.e., the deviation $X_w$, is passed in the form of a voltage to the input point of the amplifier 1 by way of a connection E and a resistor $R_1$ of about 10 kilo-ohms.

A feed-back connection 3 is also provided at the input point of the amplifier 1. This feed-back connection is used to adjust the width of the proportional range and the amplification of the regulating means or, put in other words, the upward slope of the curve V ($X_w$), wherein V is the control rate of the control member, in this example therefore the speed of the servo-motor M.

The feed-back connection 3 contains two series-connected voltage dividers consisting of resistors $R_7$, $R_8$ and $R_{10}$, $R_{11}$. Each voltage-divider tapping-off point $e$ and $f$ respectively is connected through a diode $D_1$ and $D_2$ and a resistor $R_6$ and $R_9$ to the pole $a$ and $b$ of a voltage source, which provides a D.C. voltage of about 76 volts and the middle point of which is connected to a reference potential (earth). The connecting points $g$ and $h$ between the diode $D_1$ and the resistor $R_6$ and the diode $D_2$ and the resistor $R_9$ respectively are interconnected through the two series-connected switching stages $K_{11}$ and $K_{22}$. Between the points connecting the two voltage dividers and the two switching stages $K_{11}$ and $K_{22}$ there is an RC-element $C_1$, $R_4$, which consists of a condenser $C_1$ and an adjustable resistor $R_4$ which are connected in parallel. The RC-element $C_1$, $R_4$ is also connected to the input point of the amplifier through a relatively highly-rated resistor $R_3$ of approximately 10 megohms.

The tapping-off points $e$ and $f$ on the voltage dividers are connected through an adjustable resistor $R_{12}$. It is thus possible to fix the potential at the tapping-off points $e$ and $f$ and therefore that voltage limiting value determining the width of the proportional range to which the condenser $C_1$ is charged when the value of the voltage constituting the deviation is greater than the value of the limiting value voltage, taking into account the relative ratings of the resistors $R_1$ and $R_3$.

The mode of operation of the regulating means will now be described in more detail and by reference to FIG. 2. Here, consideration will be given only to one direction of rotation of the motor M in connection with which only one switching element $K_1$ and the associated switching stages $K'_1$ and $K_{11}$ are actuated. For rotation in the reverse direction, the mode of operation is the same except that the switching element $K_2$ and the associated switching stages $K'_2$ and $K_{22}$ are actuated.

The inertia of the motor will be assumed to be so low that it will turn at full speed virtually immediately upon receiving operating voltage.

When no deviation is present, the switching stages $K'_1$ and $K_{11}$ are open (interrupted), so that the motor is at a standstill. If however a deviation occurs that is so great that the switching element $K_1$ responds, the switching stages $K'_1$ and $K_{11}$ are closed. The motor begins to turn, and at the same time the condenser $C_1$ charges. The loading time-constant of the RC-element is largely determined by the capacitance of the condenser $C_1$ and the rating of the resistor $R_4$, which is assumed to be low as compared with the rating of the resistor $R_3$. The voltage at the condenser $C_1$ sends current through $R_3$ and the voltage corresponding to the deviation $X_w$ sends a current through $R_1$. The two currents are superimposed at the connection point F, the signs being opposite. This corresponds to a connection in opposition of the two voltages in the ratio of the resistance ratings of $R_1$ and $R_3$. If the voltages at the condenser $C_1$ has risen to an extend such that the sum of the currents at point $f$ is zero or falls below a value at which the output voltage of the amplifier 1 does not suffice to keep the switching element $K_1$ in the operative position, the switching stages $K'_1$ and $K_{11}$ are opened so that the motor is stationary. At the same time, the condenser $C_1$ discharges through the resistor $R_4$ until the sum of the currents at point F exceeds a value at which the switching element $K_1$ is switched in again. Each time that the motor is switched on, it reduces the deviation $X_w$. This procedure is repeated until the deviation is again zero or has decreased to such extent that the amplifier output voltage no longer suffices to cause the switching element $K_1$ to respond. The ratio of the on period of the motor to its off period and thus its mean control rate V or speed depends, within the proportional range $X_p$, both on the magnitude of the deviation $X_w$ and on the charging rate of the condenser $C_1$. The dependence is illustrated in FIG. 2. The greater $R_4$, the smaller is V, and the greater $X_w$, the greater is V. The limit of the proportional range $X_p$ along the x-axis is determined by the potential at the point $e$, since if the deviation is greater than this limiting value, the condenser $C_1$ must have charged to a voltage which is greater than the voltage at the resistor $R_8$ in order to compensate the voltage corresponding to the deviation, which is rendered possible by the fact that the ratio of $R_6$ to $R_4$ is smaller than that of $R_7$ to $R_8$. However, as soon as the voltage at $C_1$ exceeds the voltage at the resistor $R_8$, the diode $D_1$ becomes conductive. Since the voltage divider $R_7$, $R_8$ has a relatively low resistance, so that the potential at point e is practically constant irrespective of the load on the voltage divider, the condenser $C_1$ does not continue to charge so that the voltage at the condenser $C_1$ is held firmly at this value. As long as the deviation is above this limiting value, the motor turns at maximum speed or control rate V. (In FIG. 2 the speed or control rate is plotted as a percentage of the maximum level). In the case of deviations exceeding this limiting value it is thus ensured that the deviation is balanced out at a very high speed. Simply by selecting the appropriate resistor $R_{12}$ it becomes possible to fix this limiting value.

The rise $\tan\alpha$ of the curves in FIG. 2 within the proportional range and thus the amplification of the closed regulating circuit can be determined simply by appropriate selection of the rating of the resistor $R_4$. The rating of the resistor $R_4$ for $\alpha_{min}$ is determined by the stability range of the regulating circuit.

The curve having the angle of rise $\alpha_2$ is thus obtained by adjusting $R_4$ in such manner that the voltage divider ratio $R_7:R_8$ is the same as $R_6:R_4$. The potentials at the points e and g are then the same when the switching stage $K_{11}$ is closed and when the condenser $C_1$ is fully charged, so that the diode $D_1$ has no effect upon the dependence of the control rate V upon the deviation $X_w$.

If $R_4$ is so small that $R_{6:R4}$ is greater than $R_{7:R8}$, then a curve having an angle of rise $\alpha_1$ is obtained.

When $R_4$ is zero, the angle of rise $\alpha$ is 90°. The regulating means then operates like a three-point regulating means having a neutral zone.

I claim:

1. Control element regulating means having an adjustable proportional range, comprising, a proportional regulator having an input circuit and an output side, a control element having switch means and being responsive to current from said proportional regulator for on and off operation, a control circuit connected to said proportional regulator input circuit, said control circuit having switch means and including a parallel R-C unit, said control circuit having first adjustable means for adjusting the supply voltage for said R-C unit and second adjustable means for adjusting the time constant of said R-C unit, a switching device connected between said proportional regulator output side and said control element, said switching device being responsive to current from said proportional regulator to operate said control element and both of said switch means.

2. Control element regulating means according to claim 1 wherein said control circuit includes power supply terminals and a pair of resistors forming a voltage divider in series with one of said terminals, a resistor and a diode in parallel with one of said resistors, said control circuit switch means being between said resistor and said R-C unit.

3. Control element regulating means according to claim 2 wherein said means for adjusting the supply voltage for said R-C unit is an adjustable resistor connected between the top of said voltage divider and ground.

4. Control element regulating means according to claim 1 wherein the resistor part of said R-C unit is adjustable.

* * * * *